Sept. 9, 1969            D. FISHER            3,465,445

DRAWING AND DESIGN APPARATUS OR INSTRUMENT

Filed Feb. 16, 1968            2 Sheets-Sheet 1

INVENTOR
DENYS FISHER

Sept. 9, 1969             D. FISHER             3,465,445

DRAWING AND DESIGN APPARATUS OR INSTRUMENT

Filed Feb. 16, 1968             2 Sheets-Sheet 2

INVENTOR
DENYS FISHER

United States Patent Office 3,465,445
Patented Sept. 9, 1969

1

3,465,445
DRAWING AND DESIGN APPARATUS OR INSTRUMENT
Denys Fisher, Collingham, England, assignor to Denys Fisher Group Limited, a British company
Filed Feb. 16, 1968, Ser. No. 706,165
Claims priority, application Great Britain, Mar. 3, 1967, 10,107/67
Int. Cl. B43l 11/00
U.S. Cl. 33—27          4 Claims

ABSTRACT OF THE DISCLOSURE

A design drawing device comprising a hinged folded primary member having straight walls and a window opening, at least two secondary ring members having apertures to accommodate a drawing instrument, the secondary members located within the window opening and being movable by the drawing instrument to create a design drawn upon a sheet placed underneath the primary and secondary members. The design drawing device enables the user to quickly draw circles, parallel straight lines, parallel curved lines, intersecting straight and curved lines and various designs made up of such elements. The plurality of apertures which are present in the secondary members are arranged on different pitch circle diameters. In embodiment, two of the secondary members are located side by side in a rectangular window opening while in another embodiment they are located concentrically with each other within a rectangular window opening.

---

Figure 1:
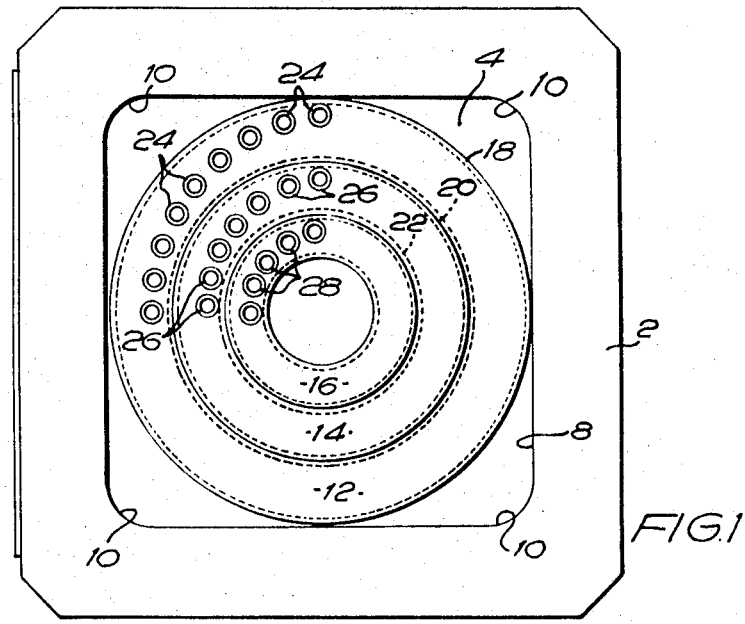

This invention relates to designs and drawing devices, particularly but not exclusively for use by young persons.

The invention seeks to provide a comparatively simple form of designs or drawing device which will enable a user to quickly inscribe circles and other lines on drawing paper or other surfaces without the aid of compasses, dividers, rulers and so on.

It has previously been proposed to provide a design or drawing device for inscribing a plurality of parallel lines, said lines being either straight or curved, the device comprising a disc having a number of radial lines marked thereon so as to divide the disc into a plurality of, say eight, segments. Each segment has a number of holes on differing pitch circle diameters. The disc moves along the periphery of a drawing instrument such as a T-square or a draughtsman's scroll, a writing instrument being inserted into one of the holes. The tangential contact of the disc and drawing instrument remains the same, i.e. the point of contact of the disc and instrument remains the same, throughout the use of the disc, except of course when a differing hole is engaged by the writing instrument. Thus the disc is moved relatively to a given point on the drawing instrument whilst in contact with the latter.

A similar instrument to that described above has also been proposed, but this differs from the above in that the holes in the disc are hexagonal-shaped, and also that the holes are arranged on an Archimedean curve or a substantially Archimedean curve. Operation is as described above.

Each of the above-described apparatuses suffer the disadvantage that they can produce straight or curved paral-

2 lel lines but cannot produce any other design or pattern.

The chief object therefore of the present invention is the provision of a designs or drawing instrument which, in addition to being cpaable of producing the above-mentioned parallel lines, is also capable of producing other and more interesting designs.

A further object of the present invention is the provision of a designs or drawing instrument which is cheap to manufacture and which is simplicity itself to operate.

Other objects of the invention will become apparent from the ensuing description.

According to the present invention, there is provided a design drawing device comprising, in combination a primary member having a window opening therein; at least two secondary ring-shaped members, said secondary members each having at least one aperture for accommodating a drawing instrument; said secondary members being locatable within said window opening; said drawing instrument being placed in one of said apertures in a selected secondary member and serving as driving means to move said selected secondary member within said window opening and relative to said primary member; the moving of said selected secondary member by said drawing instrument causing a design to be drawn upon a surface beneath said primary member.

Preferably, the primary member will comprise two plates which when in their operative positions will lie face-to-face and which will be secured together by a hinge, the upper of said plates having a plain-walled window therein. The secondary members, which will be three in number, will each be formed as rings, each ring having a plurality of holes arranged on differing pitch circle diameters. The holes will preferably have walls which taper inwardly from the upper surface of the secondary members to the lower surfaces thereof. The primary and secondary members will preferably be formed of a synthetic plastics material, the secondary members being transparent.

Figure 2:
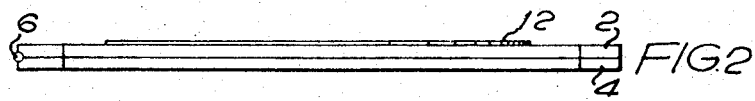
Figure 3:
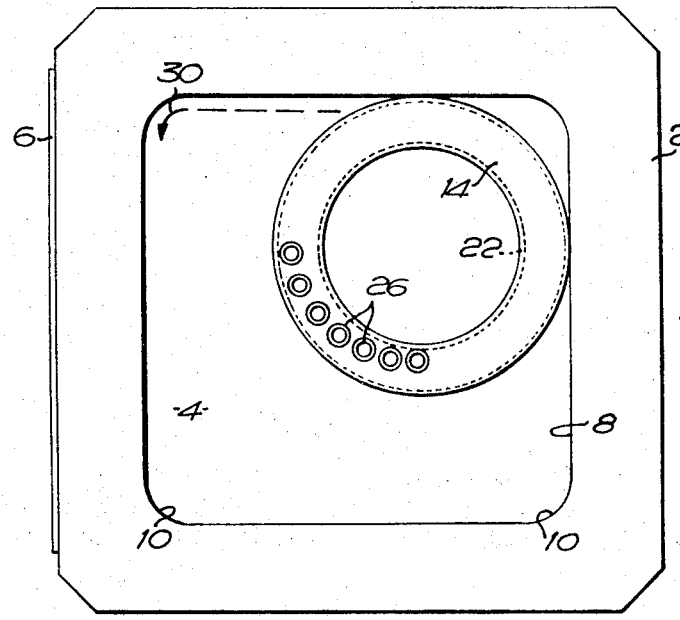
Figure 4:
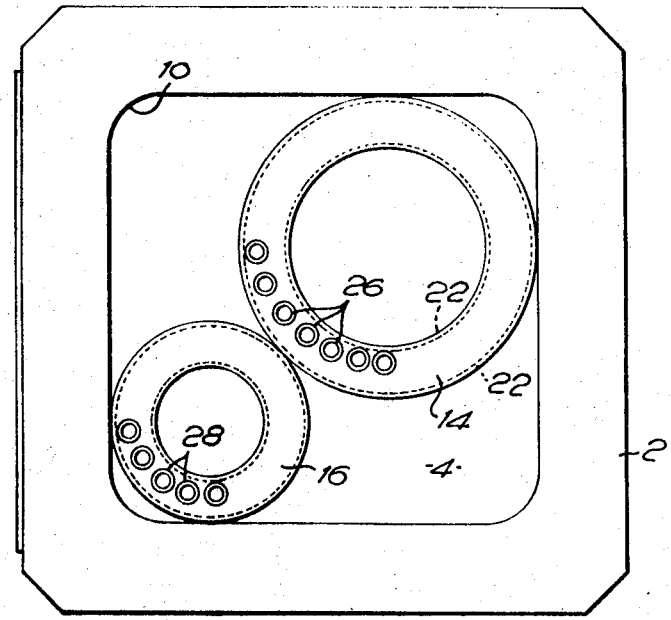
Figure 5:
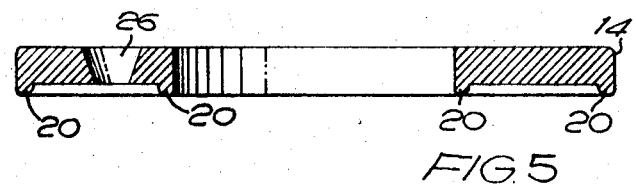

In order that the invention may be more readily understood, reference will now be made to the accompanying drawings which illustrate a preferred embodiment of the invention, and in which:

FIGURE 1 is a plan view of the device;
FIGURE 2 is a front elevation of FIGURE 1;
FIGURE 3 shows some of the members illustrated in FIGURE 1 in a different position of operation;
FIGURE 4 shows a further position of operation of some of the members of FIGURE 1; and
FIGURE 5 is a cross-section of one of the members shown in FIGURE 1, drawn to a larger scale.

Referring to the drawings, the device comprises a primary member composed of a pair of plates 2 and 4 pivotally connected one to the other by a hinge 6. The member 2 has a plain-walled window 8 therein which is substantially square and which has its corners rounded as indicated by reference numeral 10. The members 2 and 4 are composed of a synthetic plastics material.

Also provided and forming part of the device are three secondary members which, as illustarted, are formed as rings 12, 14 and 16. Each ring 12, 14 and 16 is composed of a transparent synthetic plastics material and is provided, as will be seen from FIGURE 5, with downwardly projecting peripheral lips 18, 20 and 22 respectively. Each ring 12, 14 and 16 is also provided respectively with a plurality of holes 24, 26 and 28, the holes having diameters which decrease from the upper surface to the lower surface of the ring. The holes in each ring are arranged on differing pitch circle diameters from the theoretical centres of the rings.

The ring 12 has an external diameter such that it contacts all four walls of the window 8 but such that it may move relative to and within said window as will be explained later. The radial thickness of the ring 12 is of a predetermined dimension which is governed by other dimensions as will be understood from the following. The external diameter of the ring 14 is such that it closely fits and may move relatively to the ring 12, and the external diameter of the ring 16 is such that it closely fits and may move relative to the ring 14. Thus the three rings 12, 14 and 16 may be arranged concentrically to each other and while so arranged may be located within the window 8 of the member 2 as shown in FIGURE 1. The radial thicknesses of the rings 12 and 14 are respectively governed as will be appreciated, by the external diameters of the rings 14 and 16. The external diameters of the second and third rings 14 and 16 will, in addition, be such that they may also be arranged tangentially to each other within the window 8 as shown in FIGURE 4.

Each ring 12, 14 and 16 may, if desired, be marked with four radial lines each at 90° intervals to the other so that radial lines on each ring may be arranged in radial alignment at the commencement of a design or pattern drawing. In addition, the holes in each ring may be numbered consecutively, the holes in each ring nearer to the outer periphery being numbered 1. Thus with rings as illustrated in the drawings, the holes in ring 12 would be numbered "1 to 9," the holes in ring 14 numbered "1 to 7" and the holes in ring 16 being numbered "1 to 5." Thus by inserting a drawing instrument in several holes and obtaining a pattern or design, a record may be kept of the ring and hole numbers should it be desired to repeat the pattern at a future date.

When it is deired to draw or inscribe a design, the member 2 is hinged upwardly and a piece of paper or other material (not shown) is placed on the member 4, whereafter member 2 is lowered so as to trap the paper or other material. Thus the latter is visible and accessible through the window 8 in the member 2.

Operation of the device may take place in a number of ways. For ease in understanding the following descriptions of operation, the hole numbers and radial lines mentioned previously, will not be referred to.

In a first mode of operation, the rings 12, 14 and 16 are arranged concentrically with each other and within the window 8 as illustrated in FIGURE 1, the rings 12, 14 and 16 resting with their peripheral flanges on the underlying paper or other material. A drawing instrument, such as a ball point pen, not shown, is then inserted into any one of the holes 24, 26 and 28 such that the point or tip of the instrument projects through the engaged or selected ring onto the paper or other material. The drawing instrument may then be used as a driver to rotate the engaged or selected ring relative to the other rings and the walls of the window 8, said drawing instrument simultanoeusly inscribing a circle on the paper or other material. By then inserting the drawing instrument into the other holes in the same ring and then into the holes in the other rings a series of concentric circles will be inscribed upon the paper or other material. It should be understood in the above-described mode of operation, that the ring 12 may be utilised without the rings 14 and 16.

In a second mode of operation, the ring 14 is placed within the window 8 such that a point on the periphery of the ring 14 engages one of the walls of the window as illustrated in FIGURE 3. By then inserting the drawing instrument in one of the holes 26 and moving the ring 14 so that the engaged hole is as near as possible to the contacting wall, the ring 14 may be moved around the wall in the direction of arrow 30 (or in an opposite direction thereto) such that a line is drawn on the paper or other material, said line having a path corresponding to the shape of the wall, since the latter guides the ring 14 during movement. Repetition of the above procedure in the other holes 26 will produce a series of concentric lines. Ring 16 may then be utilised in the same manner.

In a third mode of operation, the rings 14 and 16 are placed tangentially with each other within the window 8 such that points on the rings 14 and 16 contact the walls of the window, this arrangement being shown in FIGURE 4. Insertion of the drawing instrument into one of the holes 26 of ring 14 and movement of the ring as described in the first embodiment, will inscribe a circle on the paper or other material, ring 14 rotating about a fixed axis and being guided during its movement by the walls of the window 8 and by the outer periphery of ring 16. Insertion of the drawing instrument into the other holes 26 of ring 14 will cause the inscription of a series of concentric circles.

The drawing instrument may then be inserted, in turn, into the holes 28 of the ring 16 thus producing a second series of concentric circles to be drawn in the opposite corner of the window. The positions of the rings 14 and 16 circles inscribed. Positioning the rings 14 and 16 in turn in the other corners of the window 8 will result in a great many such series of concentric circles to be drawn.

Whilst the above operations have been described separately, it should be appreciated that the several modes of operation may be carried out on the same piece of paper or other material, such that the several designs become superimposed.

It will also be appreciated that whilst the rings 12, 14 and 16 have been related as movable members, the inner and outer peripheries of the rings may also be used for inscribing circles, the rings in this case acting as stencils.

Finally, it should be understood that one or more pegs or projections may be provided to better retain the paper or other material in position during operation of the device, said pegs or projections being integral with or secured to the member 2 and engaging in slots in the member 4 or vice-versa.

I claim:

1. A design drawing device comprising in combination a flat, primary member having a substantially square window opening therein, at least two ring members, one of said ring members being larger than the other and having an external diameter such that its outer peripheral surface contacts all four walls of said window opening but such that it may be revolved within said window opening, the external diameter of the smaller of said rings being such that its outer peripheral surface closely fits the internal diameter of the larger ring but such that it may be revolved within said larger ring, said rings normally being nested one within the other and within said window opening, each of said ring members having at least one aperture therethrough for accommodating a drawing instrument such that the drawing instrument, upon being placed through said aperture in a selected one of said rings, may serve as driving means to revolve said selected ring within said window opening, the moving of said selected ring by said drawing instrument causing a design to be drawn upon a surface beneath said plate, and surfaces at the outer diameter of the smaller ring, the internal diameter of the larger ring, the external diameter of the larger ring and the surfaces of the substantially square window opening in said plate being normal to the plane of said plate whereby said rings may be readily removed, the smaller ring from within the larger ring and the larger ring from within said window opening whereby the smaller ring may be used alone within said window opening and driven by said drawing instrument about said window opening with its external surface in contact with the surfaces of the window opening within said plate member.

2. A design drawing device as set forth in claim 1 wherein at least one of said ring members has a plurality of apertures, said plurality of apertures being arranged on different pitch circle diameters.

3. A design drawing device as set forth in claim 1, wherein at least one of said ring members is substantially transparent.

4. A design drawing device as claimed in claim 1, wherein there is provided a third ring member which is smaller in external diameter than said second smaller ring member and which is adapted to fit within the internal diameter of said second smaller ring member, said second smaller ring member and said third ring member being of a size to touch the adjacent sides of a corner of the window opening and to touch each other.

References Cited

UNITED STATES PATENTS

| | | |
|---|---|---|
| 1,154,673 | 9/1915 | Van Ness 33—27 X |
| 1,878,633 | 9/1932 | Hoferer. |
| 2,509,164 | 5/1950 | Nath. |
| 3,230,624 | 1/1966 | Fisher. |

HARRY N. HAROIAN, Primary Examiner

U.S. Cl. X.R.

33—41